US009674081B1

(12) United States Patent
Jiang et al.

(10) Patent No.: US 9,674,081 B1
(45) Date of Patent: Jun. 6, 2017

(54) EFFICIENT MAPPING OF TABLE PIPELINES FOR SOFTWARE-DEFINED NETWORKING (SDN) DATA PLANE

(71) Applicant: Xilinx, Inc., San Jose, CA (US)

(72) Inventors: Weirong Jiang, San Jose, CA (US); Gordon J. Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/705,907

(22) Filed: May 6, 2015

(51) Int. Cl.
*H04L 12/721* (2013.01)
*H04L 12/24* (2006.01)
*H04L 12/741* (2013.01)

(52) U.S. Cl.
CPC .......... *H04L 45/38* (2013.01); *H04L 41/0803* (2013.01); *H04L 45/745* (2013.01)

(58) Field of Classification Search
CPC ....... H04L 12/56; H04L 12/26; H04L 43/045; H04L 42/0816
USPC ........................................................ 370/254
See application file for complete search history.

(56) References Cited

U.S. PATENT DOCUMENTS

| | | | | |
|---|---|---|---|---|
| 7,406,668 | B1* | 7/2008 | Pedersen | G06F 17/5054 716/103 |
| 8,787,388 | B1* | 7/2014 | Adams | H04L 45/38 370/244 |
| 2007/0061433 | A1* | 3/2007 | Reynolds | H04L 12/2602 709/223 |
| 2010/0257263 | A1* | 10/2010 | Casado | H04L 49/00 709/223 |
| 2011/0038375 | A1 | 2/2011 | Liu et al. | |
| 2013/0163427 | A1* | 6/2013 | Beliveau | H04L 67/327 370/235 |
| 2014/0146674 | A1* | 5/2014 | Wang | H04L 45/38 370/235 |
| 2014/0280802 | A1 | 9/2014 | McDowall | |
| 2014/0280900 | A1 | 9/2014 | McDowall | |

(Continued)

OTHER PUBLICATIONS

Bosshart, Paul et al., Forwarding Metamorphosis: Fast Programmable Match-Action Processing in Hardware for SDN, SIGCOMM'13 Proceedings of the ACM SIGCOMM 2013 conference on SIGCOMM, Aug. 16, 2013, pp. 99-110, Hong Kong.

(Continued)

*Primary Examiner* — Edan Orgad
*Assistant Examiner* — Sithu Ko
(74) *Attorney, Agent, or Firm* — Keith Taboada; Steven Roberts

(57) ABSTRACT

Methods and apparatus for using dynamic programming to determine the most efficient mapping of a pipeline of virtual flow tables (VFTs) onto a pipeline of physical flow tables (PFTs) in the data plane of a software-defined networking (SDN) device are described. One example method of determining a configuration for an SDN device generally includes receiving a representation of a series of one or more VFTs, each of the VFTs having one or more properties; receiving a representation of a series of one or more PFTs for hardware of the SDN device, each of the PFTs having one or more capabilities; generating, using dynamic programming based on the properties of the VFTs and the capabilities of the PFTs, a mapping of the series of VFTs onto the series of PFTs; and outputting the generated mapping for implementation on the hardware of the SDN device.

18 Claims, 7 Drawing Sheets

(56) References Cited

U.S. PATENT DOCUMENTS

2015/0023210 A1* 1/2015 Kis .................. H04L 45/563
370/254
2015/0172115 A1* 6/2015 Nguyen ............. H04L 67/10
709/226

OTHER PUBLICATIONS

Hu, Chengchen et al., "Design of All Programmable Innovation Platform for Software Defined Networking", Open Networking Summit 2014, Usenix, Mar. 2-4, 2014, pp. 1-2, Santa Clara, CA.

Kachris, Christoforos et al., "Network Function Virtualization based on FPGAs: A Framework for all-Programmable network devices", Jun. 2, 2014.

Morris, Kevin, "'Softly' Defined Networks", Electronic Engineering Journal, Apr. 8, 2014, accessed http://www.eejournal.com/archives/articles/20140408-sdnet/.

Pan, Heng et al., "The FlowAdapter: Enable Flexible Multi-Table Processing on Legacy Hardware", SIGCOMM, HotSDN'13, Proceedings of the second ACM SIGCOMM workshop on Hot topics in software defined networking, Aug. 16, 2013, pp. 85-90, Hong Kong.

Xilinx, Inc., "Software Defined Specification Environment for Networking (SDNet)," Mar. 2014, pp. 1-20, San Jose, CA USA.

Yu, Minlan et al., "NOSIX: A Lightweight Portability Layer for the SDN OS", ACM SIGCOMM Computer Communication Review, Apr. 2014; vol. 44, Issue 2, pp. 70-75, ACM New York, NY, USA.

* cited by examiner

EFFICIENT MAPPING OF TABLE PIPELINES FOR SOFTWARE-DEFINED NETWORKING (SDN) DATA PLANE

TECHNICAL FIELD

Examples of the present disclosure generally relate to software-defined networking (SDN) and, more particularly, to mapping a pipeline of virtual flow tables (VFTs) onto a pipeline of physical flow tables (PFTs).

BACKGROUND

Software-defined networking (SDN) is an approach to computer networking that permits network administrators to manage network services through abstraction of lower-level functionality. This abstraction may be accomplished by separating the control plane (the system that makes decisions about where packets are sent) from the data plane (the underlying systems that forward the packets to the selected destination). Abstracting control from forwarding allows network administrators to dynamically adjust network-wide traffic flow to meet changing needs. Network intelligence may be centralized in software-based SDN controllers that maintain a global view of the network, which appears to policy engines and applications as a single, logical device. Furthermore, SDN permits network managers to configure, manage, secure, and optimize network resources quickly via dynamic, automated SDN programs.

SUMMARY

Examples of the present disclosure generally relate to generating a resource-efficient mapping of a pipeline of virtual flow tables (VFTs) onto a pipeline of physical flow tables (PFTs) using dynamic programming.

One example of the present disclosure is a method of determining a configuration for a software-defined networking (SDN) device. The method generally includes receiving a representation of a series of one or more virtual flow tables (VFTs), each of the VFTs having one or more properties; receiving a representation of a series of one or more physical flow tables (PFTs) for hardware of the SDN device, each of the PFTs having one or more capabilities; generating, using dynamic programming based on the properties of the VFTs and the capabilities of the PFTs, a mapping of the series of VFTs onto the series of PFTs; and outputting the mapping for implementation on the hardware of the SDN device.

Another example of the present disclosure is a non-transitory computer readable-medium for determining a configuration for an SDN device. The computer-readable medium generally includes instructions executable by a processing system to receive a representation of a series of one or more VFTs, each of the VFTs having one or more properties; to receive a representation of a series of one or more PFTs for hardware of the SDN device, each of the PFTs having one or more capabilities; to generate, using dynamic programming based on the properties of the VFTs and the capabilities of the PFTs, a mapping of the series of VFTs onto the series of PFTs; and to output the mapping for implementation on the hardware of the SDN device.

Yet another example of the present disclosure is an apparatus configured to determine a configuration for an SDN device. The apparatus typically includes a processing system and a memory coupled to the processing system. The processing system is generally configured to receive a representation of a series of one or more VFTs, each of the VFTs having one or more properties; to receive a representation of a series of one or more PFTs for hardware of the SDN device, each of the PFTs having one or more capabilities; to generate, using dynamic programming based on the properties of the VFTs and the capabilities of the PFTs, a mapping of the series of VFTs onto the series of PFTs; and to output the mapping for implementation on the hardware of the SDN device. The memory is generally configured to store at least one of instructions for the processing system, the representation of the series of VFTs, the representation of the series of PFTs, or the mapping.

These and other aspects may be understood with reference to the following detailed description.

BRIEF DESCRIPTION OF THE DRAWINGS

So that the manner in which the above-recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

DETAILED DESCRIPTION

Figure 1A:
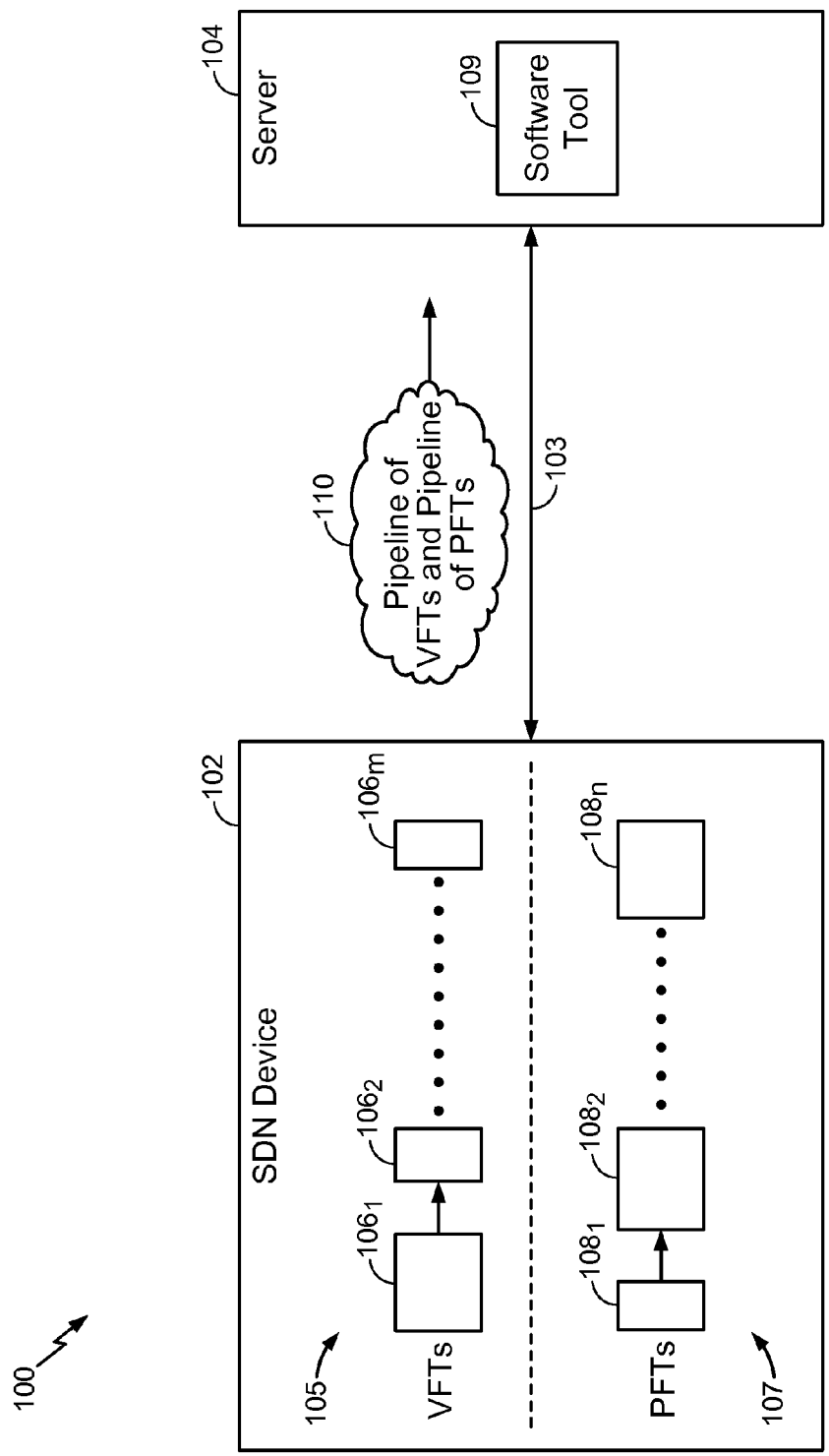
FIGS. 1A and 1B illustrate communications for determining a configuration for a software-defined networking (SDN) device in an example network composed of the SDN device and a server, in accordance with an example of the present disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples of the present disclosure provide techniques and apparatus for determining a resource-efficient mapping of a pipeline of virtual flow tables (VFTs) onto a pipeline of physical flow tables (PFTs) using dynamic programming, for example. With this mapping, a software-defined networking (SDN) device may program its physical hardware in the data plane to implement the pipeline of VFTs.

Example Mapping of Table Pipelines

SDN has emerged as a leading paradigm for future networks. SDN enables software control over a network by communicating with networking devices over some open control interface protocol, such as OpenFlow. The physical hardware implementations of SDN data planes are highly diverse, which makes portability a complicated problem for SDN applications. Recently, consensus has been reached that SDN applications are to be developed based on a higher-level packet processing representation, and then it is the hardware vendor's responsibility to provide software to map this virtual representation to the actual physical hardware. One example is the Software Defined Specification Environment for Networking (SDNet) offered by Xilinx, Inc. of San Jose, Calif.

One aspect of higher-level representations involves pipelines of flow tables used for classifying and acting upon packets. Such flow tables are mapped to real tables in hardware and, in an effort to support capabilities such as SDNet's hitless update of packet parsing and/or editing (i.e., changing functions between packets without FPGA bitstream changes), this mapping should ideally be done in real time. Existing approaches to generating optimal mappings (i.e., resource-efficient mappings) are time consuming and are not suitable for real-time use. Accordingly, techniques are needed for resource-efficient mapping of a pipeline of VFTs onto a pipeline of PFTs in a sufficiently fast manner.

Examples of the present disclosure provide methods and apparatus for determining a mapping of a pipeline of virtual flow tables (VFTs) onto a pipeline of physical flow tables (PFTs), where determination of the mapping is performed efficiently, increasing the mapping performance by several orders of magnitude compared to conventional approaches. One example mapping algorithm described herein may take into account the different properties of each VFT in the pipeline and the different capabilities of each PFT in the pipeline. The problem may be formulated as a constrained optimization problem that covers different PFT models, and the problem may be solved using a dynamic programming-based approach with efficient run time.

FIG. 1A illustrates an example network 100 composed of a software-defined networking (SDN) device 102 interfaced with a processing system, such as a server 104 (e.g., a cloud computing server), via one or more interconnections, represented by network link 103. The network link 103 may include one or more wired, one or more wireless, or a combination of wired and wireless interconnections and may be routed locally (e.g., a local area network (LAN)) or through the Internet, for example. The data plane of the SDN device 102 is programmable, such that the SDN device may be configured to function as a network switch, router, etc. The SDN device 102 may include an application-specific integrated circuit (ASIC) or a programmable integrated circuit (IC), such as a field programmable gate array (FPGA).

As for the underlying software-defined networking (SDN) abstraction, controllers or applications may be developed based on a virtual flow table (VFT) pipeline 105 composed of a series of VFTs $106_1, 106_2, \ldots 106_m$ (collectively "VFTs 106"). A hardware vendor may be responsible for mapping the VFT pipeline 105 onto a physical flow table (PFT) pipeline 107 composed of a series of PFTs $108_1, 108_2, \ldots 108_n$ (collectively "PFTs 108"). Each flow table may be a match action table used to match a set of packet headers to determine what action to execute for a packet. For some examples, each flow table may be used for a different header field. The VFT pipeline 105 may be changed dynamically, as described in more detail below. Different applications may call for different VFT properties, and different PFTs 108 may have varying capabilities. The PFT pipeline 107 may be relatively slow to rebuild (e.g., with an FPGA) or may be fixed (e.g., with an ASIC or an application-specific standard product (ASSP)).

Several use cases may implicate hitless updates of the pipelines. For example, the number m of VFTs 106 in the pipeline 105 may be modified, which may be due to adding or subtracting protocol layers or Network Function Virtualization (NFV), which may involve changing the functions of the forwarding plane. As another example, the widths of one or more VFTs 106 may be adjusted. This may be due to adding or subtracting protocol layers, NFV, or dynamic protocol upgrades as workloads change. As yet another example, the depths (i.e., the number of entries) of one or more VFTs 106 may be altered, which may be due to increasing or reducing the number of flows or to changing workloads and dynamic traffic management. Other example use cases involve switching one or more PFTs 108 on and off during operation (e.g., for power optimization) or providing for rapid prototyping and experimentation (e.g., a new VFT to be mapped).

Figure 2:
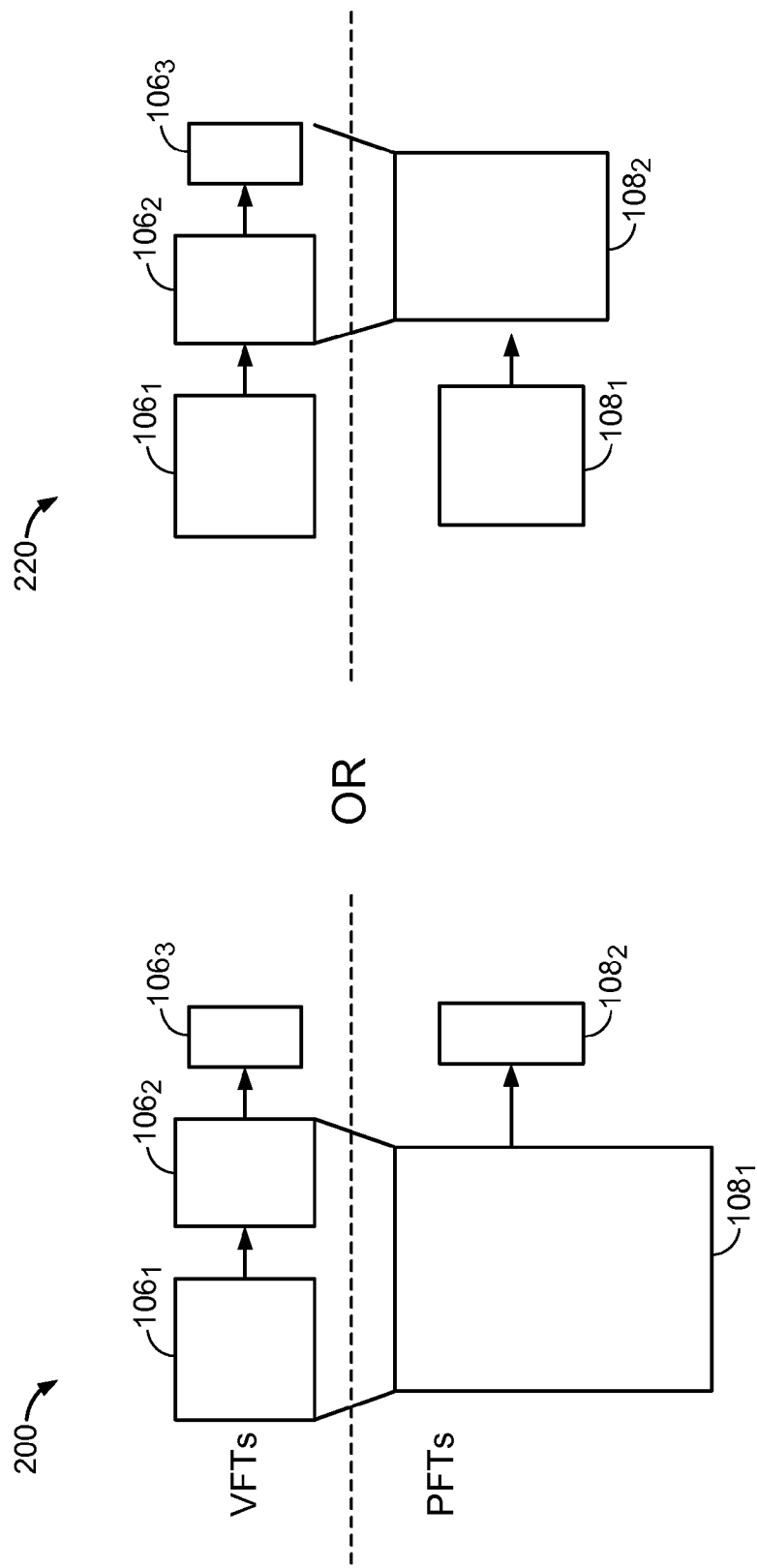
FIG. 2 illustrates example alternative mappings of a pipeline of virtual flow tables (VFTs) onto a pipeline of physical flow tables (PFTs) according to a flexible PFT model, in accordance with an example of the present disclosure.

There are several different PFT pipeline models for implementing the PFTs 108 in hardware, including flexible, fixed, and hybrid models. In the flexible model, each PFT 108 is a configurable ternary content addressable memory (TCAM). For example, a 64 kb TCAM may be configured as a 1 k×64 b, 2 k×32 b, 4 k×16 b, or 8 k×8 b PFT, where the first number is the depth of the PFT and the second number is the width of the PFT in bits. In the fixed model, each PFT 108 is a fixed TCAM (e.g., the width and depth of the TCAM is immutable). For the hybrid model, a PFT 108 may be a special-purpose table or a configurable/fixed TCAM. The PFT may be categorized into three types: (1) an exact match (EM); (2) a prefix match (PM), which may have various algorithmic solutions; and (3) a wildcard match (WM), which calls for a TCAM. The EM type may be efficient to implement as a hash table and may be used for a media access control (MAC) table. Since the MAC address is an exact value, ternary bits need not be used. The PM type may be used for an Internet Protocol (IP) forwarding table, where the rules are a set of prefixes. The hybrid model may be considered as a superset of the fixed and flexible models FIG. 2 illustrates example alternative mappings 200, 220 for an example pipeline of VFTs $106_1, 106_2, 106_3$ (m=3) onto an example pipeline of PFTs $108_1, 108_2$ (n=2) according to a flexible PFT model, in accordance with an example of the present disclosure. For the flexible model, the key constraint is table size (e.g., the total number of bits in the table). If the number of VFTs 106 is less than or equal to the number of PFTs 108 (m≤n), the solution can be found by determining a mapping according to a greedy algorithm, finding PFTs 108 that fit the VFTs 106. As used herein, a "greedy algorithm" generally refers to an algorithm that follows a problem solving heuristic of making a locally optimal choice at each stage of the problem. If m>n, multiple VFTs 106 may most likely be merged into a PFT 108. Such merging may cause cross-producting in the worst case. For example, a VFT with 100 entries and a VFT with 10 entries are merged, leading to a PFT with 1000 entries (=100×10).

In the example mapping 200, the first two VFTs 106₁, 106₂ in the pipeline 105 are merged into the first PFT 108₁ in the pipeline 107, and the last VFT 106₃ is mapped onto the last PFT 108₂. This mapping 200 leads to the first PFT 108₁ having a relatively large size, especially in relation to the last PFT 108₂. In the example mapping 220, the first VFT 106₁ in the pipeline 105 is mapped onto the first PFT 108₁ in the pipeline 107, and the next two VFTs 106₂, 106₃ are merged into the last PFT 108₂. The mapping 220 is preferred over the mapping 200 since the combined table size of the two PFTs in the mapping 220 is smaller (i.e., uses less resources) than the combined table size of the two PFTs in the mapping 200.

Figure 3:
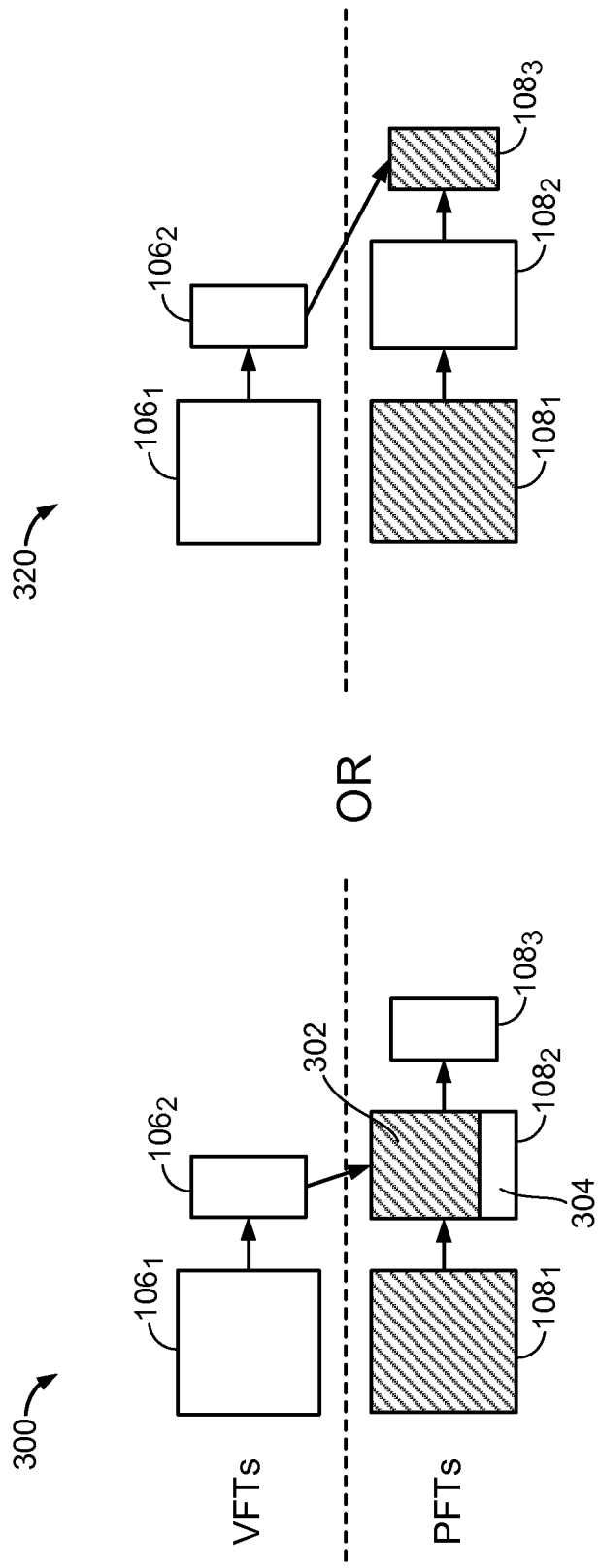
FIG. 3 illustrates example alternative mappings of a pipeline of VFTs onto a pipeline of PFTs according to a fixed PFT model, in accordance with an example of the present disclosure.

FIG. 3 illustrates example alternative mappings 300, 320 for an example pipeline of VFTs 106₁, 106₂ (m=2) onto an example pipeline of PFTs 108₁, 108₂, 108₃ (n=3) according to a fixed PFT model, in accordance with an example of the present disclosure. For the fixed model, the key constraints are table size and table width. For example, a wide VFT cannot be mapped onto a narrow PFT in the fixed model. The fixed model also has the cross-producting problem when m>n. When m≤n, different mappings cause different resource usage as can be seen when comparing the mappings 300, 320.

In the example mapping 300, the first VFT 106₁ in the pipeline 105 is mapped onto the first PFT 108₁ in the pipeline 107 and uses all (or at least nearly all) the resources in first PFT. The second VFT 106₂ is a relatively narrow VFT and is mapped onto the second PFT 108₂, which is significantly wider than the second VFT. Mapping a narrow VFT onto a wide PFT causes resource wastage, as in the mapping 300 where the second VFT 106₂ uses only a portion 302 of the second PFT 108₂ and the remaining portion 304 of the second PFT 108₂ represents unutilized resources. Thus, the example mapping 320 is preferred, in which the second VFT 106₂ is mapped onto the third PFT 108₃, which has a more similar width (and size) to the second VFT. Therefore, there is less resource wastage in the mapping 320 compared to the mapping 300.

Figure 4:
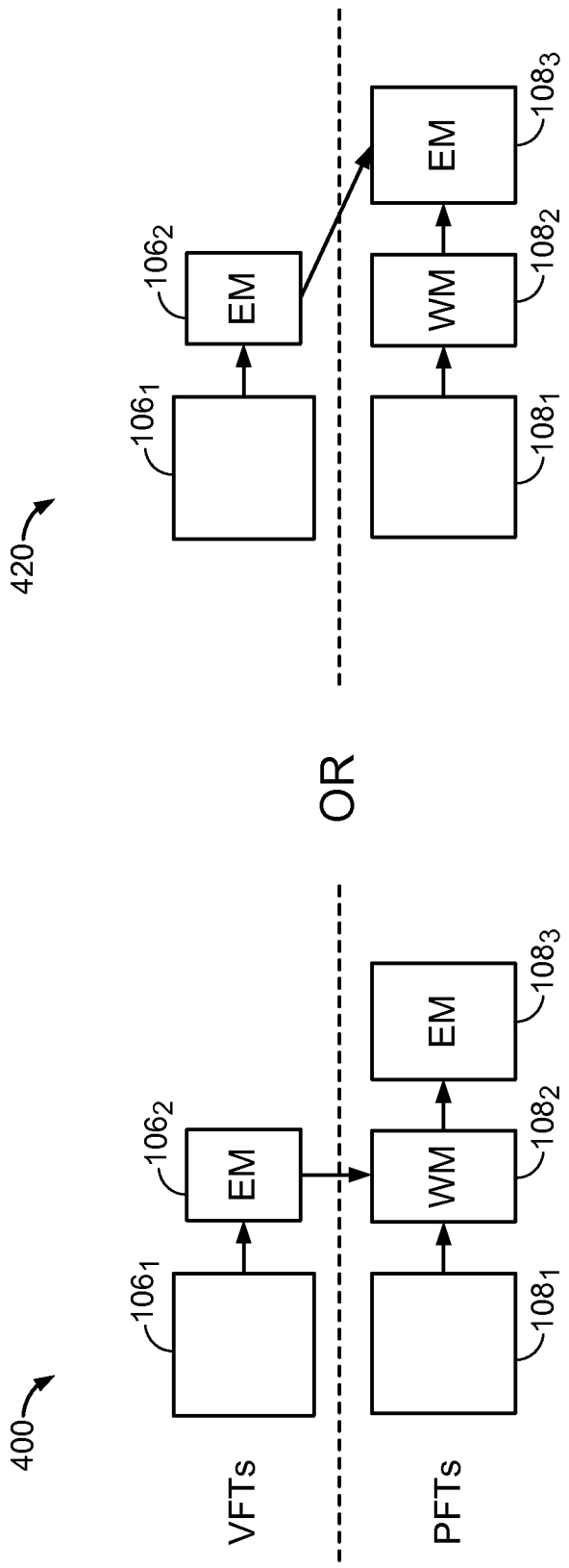
FIG. 4 illustrates example alternative mappings of a pipeline of VFTs onto a pipeline of PFTs according to a hybrid PFT model, in accordance with an example of the present disclosure.

FIG. 4 illustrates example alternative mappings 400, 420 for an example pipeline of VFTs 106₁, 106₂ (m=2) onto an example pipeline of PFTs 108₁, 108₂, 108₃ (n=3) according to a hybrid PFT model, in accordance with an example of the present disclosure. For the hybrid model, the key constraints are table size, table width, and table type. As an example of a table type constraint, a WM (wildcard match) VFT may not be mapped onto an EM (exact match) PFT. There are several mapping rules regulating onto which types of PFTs a particular type of VFT can be mapped. Namely, the mapping rules may be as follows: (1) an EM VFT can be mapped onto an EM, a PM, or a WM PFT; (2) a PM VFT can be mapped onto a PM or a WM PFT; and (3) a WM VFT can be mapped onto a WM PFT. There are also a few merging rules dictating into which particular type of PFT multiple VFTs of various types can be merged. Specifically, the merging rules may be as follows: (1) two or more EM VFTs can be merged into an EM PFT; (2) a combination of EM and PM VFTs can be merged into a PM PFT; (3) two or more PM VFTs can be merged into a WM PFT; and (4) a WM VFT with any other VFT(s) of any type can be merged into a WM PFT.

The hybrid model has all the problems described above for the flexible and fixed models. Furthermore, there may be a cost associated with implementing the different PFT types, which may be taken into account. This implementation cost may be expressed as a cost ratio, which may be roughly EM:PM:WM=1:2:6, for example, when implementing a same-size PFT of different types using an FPGA.

In the example mapping 400, the second VFT 106₂ in the pipeline 105 is an EM VFT, which is mapped onto the second PFT 108₂ in the pipeline 107, which is a WM PFT. Although the second VFT 106₂ has a similar table size and width as the second PFT 108₂, each bit in the WM PFT uses 6 times more resources than each bit in an equivalent EM table, according to the example implementation cost function above. Therefore, the example mapping 420 is preferred, in which the second VFT 106₂ is mapped onto the third PFT 108₃, which is an EM PFT. Although the third PFT 108₃ may be larger than the second VFT 106₂ and thus the mapping 420 involves some resource wastage, there is far less resource cost involved with this mapping 420 since the implementation cost is 1:1 (EM:EM).

Returning to FIG. 1A, a software tool 109 (e.g., executed on the server 104 or another processing system) may be employed to implement a mapping algorithm to map the pipeline 105 of VFTs 106 onto the pipeline 107 of PFTs 108. The software tool 109 may receive as inputs a pipeline of m VFTs (or a representation thereof) and a pipeline of n PFTs (or a representation thereof). Each VFT may be associated with its own specifications or properties (e.g., width, depth, match type, etc.). Likewise, each PFT may be associated with its own capabilities (e.g., width, depth, match type, etc.). For some examples, the inputs may be communicated from the SDN device 102 to the server 104 via the link 103 in one or more input messages 110.

According to some examples, the software tool 109 may also receive as an input the implementation cost function for different types of PFT (e.g., EM:PM:WM=1:2:6). For some examples, the implementation cost function may be communicated (e.g., from the SDN device 102 to the server 104) together with the pipeline data in the input message(s) 110 or as a separate input message.

Figure 1B:
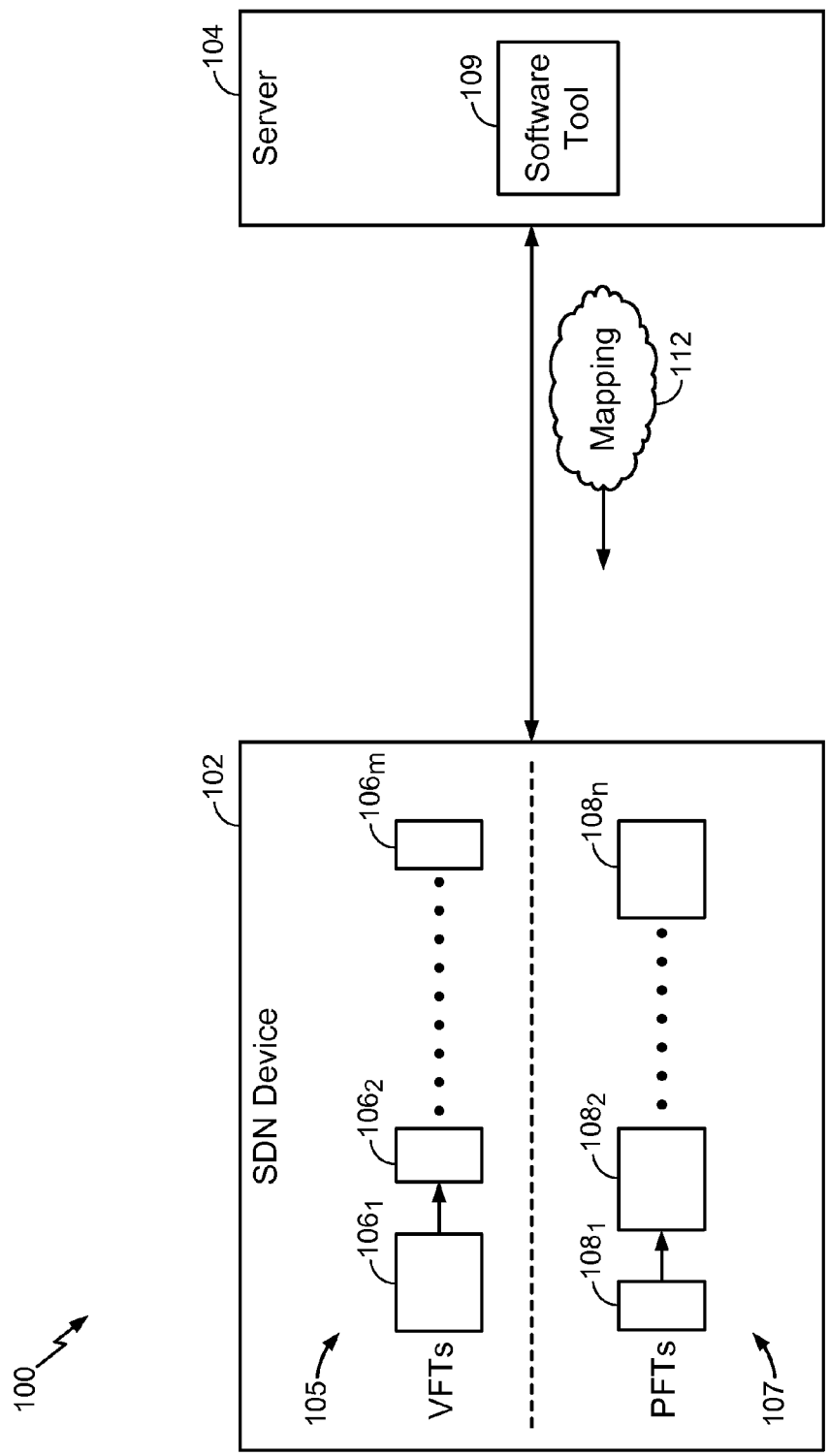

Referring now to FIG. 1B, the software tool 109 may process the inputs and perform the mapping algorithm to determine the most resource-efficient mapping of the VFTs onto the PFTs. The software tool 109 may then output this mapping or an indication that this particular pipeline of VFTs cannot be mapped onto the pipeline of PFTs. For some examples, the output of the software tool 109 may be communicated from the server 104 to the SDN device 102 via the link 103 in an output message 112. After receiving the output message 112, the SDN device 102 may program the contents of its hardware in the SDN data plane based on the mapping.

To perform the mapping algorithm, each flow table may be represented as $(w_i, d_i, t_i)$, where index i=1, 2, ..., w is the table width, d is the table depth, and t is the table type (EM: t=0; PM: t=1; WM: t=2). The index i reflects the series order of the tables in the pipeline. The most efficient mapping will have the lowest resource cost, as expressed by the following equation:

$$\min \sum_{i=1}^{n} C_i$$

where $C_i$ is the resource cost of the $i^{th}$ PFT (consumed to store one or more VFTs). The mapping algorithm may be subject to various constraints, such as completeness (i.e., each of the VFTs is mapped onto a PFT), expressed as follows:

$$U_{i=1}^{n} V_i = \{1, 2, \ldots, m\};$$

ordering, expressed as follows:

$$p_i \leq p_j, \forall i < j, i, j \in \{1, 2, \ldots, m\};$$

table width (i.e., sum of the widths of the VFTs mapped to the $i^{th}$ PFT is less than or equal to the width of the $i^{th}$ PFT), expressed as follows:

$$\sum_{j \in v_i} w_j \leq W_i, \forall i \in \{1, 2, \ldots, n\};$$

table size (i.e., product of the depths of the VFTs mapped to the $i^{th}$ PFT is less than or equal to the depth of the $i^{th}$ PFT), expressed as follows:

$$\prod_{j \in v_i} d_j \leq D_i, \forall i \in \{1, 2, \ldots, n\}; \text{ and}$$

table type (i.e., the "Vee" operation of the VFTs mapped to the $i^{th}$ PFT is less than or equal to the type of the $i^{th}$ PFT), expressed as follows:

$$V_{j \in v_i} t_j \leq T_i, \forall i \in \{1, 2, \ldots, n\}.$$

For some examples, there may possibly be other constraints, as well, such as throughput. In the expressions above, $V_i$ is the set of indices of the VFTs that are mapped to the $i^{th}$ PFT, $p_i$ is the index of the PFT to which the $i^{th}$ VFT is mapped, $W_i$ is the table width of the $i^{th}$ PFT, $D_i$ is the table depth of the $i^{th}$ PFT, and $T_i$ is the table type of the $i^{th}$ PFT. The "Vee" operation V( ) is defined as:

$$V(0,*) = *$$

$$V(1,1) = 2$$

$$V(2,*) = 2$$

where * is a wildcard variable.

Exhaustive Search Mapping Algorithm

One possible solution for the mapping algorithm is an exhaustive search algorithm. Although this solution generates an optical mapping (defined in terms of resource costs), the exhaustive search algorithm has a very high computation complexity and may not be suitable for real-time mapping to support hitless updates.

To implement the exhaustive search algorithm, the m VFTs 106 (input to the software tool 109) may first be grouped into k groups. The number of combinations may be expressed as $$\binom{m-1}{n-1}$$

where k=1, 2, . . . , min(m,n). Then, the k groups may be mapped onto n PFTs. This number of combinations may be expressed as $$\binom{n}{k}$$

Thus, the total number of combinations is $$\sum_{k=1}^{\min(m,n)} \binom{m-1}{n-1} \cdot \binom{n}{k}$$

The complexity of the exhaustive search algorithm may be expressed as $O(n^m)$ if m≤n or $O(m^n)$ if m>n. For example, the exhaustive search algorithm may take 2 seconds to map a 10-stage VFT pipeline onto a 10-stage PFT pipeline.

Dynamic Programming Mapping Algorithm

An alternative solution for implementing the mapping algorithm involves dynamic programming. As used herein, "dynamic programming" generally refers to an algorithm that breaks a more complicated problem into simpler subproblems in a recursive manner. Often used for optimization, dynamic programming algorithms examine the previously solved subproblems and combine their solutions to yield the best solution for the given problem.

To implement mapping using dynamic programming, let Opt(m, n) be the minimum cost of mapping the first m VFTs onto the first n PFTs, where $$\text{Opt}(m,n) = \min_{k=0,1,\ldots,m} \{\text{Opt}(k, n-1) + C_n + 1, m)\}$$

and where $C_n$ (i,j) is the cost function of merging the $i^{th}$ $(i+1)^{th}$, . . . , $j^{th}$ VFTs into the $n^{th}$ PFT. This mapping equation meets the completeness and the ordering constraints described above by nature. Furthermore, the dynamic programming method applies regardless whether m>n or not. The complexity of the dynamic programming algorithm may be expressed as $O(m^3 n)$. For example, the dynamic programming algorithm may take 2 milliseconds (ms) to map a 10-stage VFT pipeline onto a 10-stage PFT pipeline, three orders of magnitude faster than the exhaustive search algorithm.

In order to illustrate how to apply dynamic programming to determine the most resource-efficient mapping, a number of cases are presented below for the different PFT models.

With a flexible PFT model, the key constraint is table size. For a merged table of two VFTs, W=w1+w2, D=d1*d2, and T=t1=t2=2, where w1 is the width of a first VFT, w2 is the width of the second VFT, d1 is the depth of the first VFT, d2 is the depth of the second VFT, t1 is the table type of the first VFT, t2 is the type of the second VFT, W is the resulting width of the merged table, D is the resulting depth of the merged table, and T is the resulting table type of the merged table. With a flexible PFT model, only TCAMs are being considered, so all types are the same. In this case, the overall size constraint is written as $$\left(\sum_{j \in v_i} w_j\right) \cdot \left(\prod_{j \in v_i} d_j\right) \leq W_i D_i, \forall i \in \{1, 2, \ldots n\}$$

Based on the overall size, the cost function in this case may be defined as $$C_n(i, j) = \left(\sum_{k=i}^{j} w_k\right) \cdot \prod_{k=i}^{j} d_k$$

$C_n(i,j)=+\infty$, if $C_n(i,j)>W_nD_n$ (to meet the size constraint).

This cost function may be used in the minimum cost function Opt(m,n) defined above.

With a fixed PFT model, the table size and width are fixed and are the key constraints. For a merged table of two VFTs, W=w1+w2, D=d1*d2, and T=t1=t2=2 as described above. Here again with a fixed PFT model, only TCAMs are being considered, so all types are the same. In this case, the cost function may be defined as $$C_n(i, j) = W_n \prod_{k=i}^{j} d_k$$

$$C_n(i, j) = +\infty, \text{ if } \prod_{k=i}^{j} d_k > D_n \text{ (to meet the size constraint)}$$

$$C_n(i, j) = +\infty, \text{ if } \sum_{k=i}^{j} w_k > W_n \text{ (to meet the width constraint).}$$

This cost function may be used in the minimum cost function Opt(m,n) defined above.

For a merged table of two VFTs in the case of a hybrid PFT, W=w1+w2 and D=d1*d2 as described above. However, T=t1 V t2, where V represents the "Vee" operation described above. In this case, the cost function may be defined as $$C_n(i, j) = H(T_n)W_n \prod_{k=i}^{j} d_k$$

$$C_n(i, j) = +\infty, \text{ if } \prod_{k=i}^{j} d_k > D_n \text{ (to meet the size constraint)}$$

$$C_n(i, j) = +\infty, \text{ if } \sum_{k=i}^{j} w_k > W_n \text{ (to meet the width constraint)}$$

$$C_n(i, j) = +\infty, \text{ if } V_{k=i}^{j} t_k > T_n \text{ (to meet the type constraint)}$$

where H( ) represents the hardware implementation cost factor based on the table type (e.g., EM: H(0)=1; PM: H(1)=2; and WM: H(2)=6). This cost function may be used in the minimum cost function Opt(m,n) defined above.

Greedy Mapping Algorithm

Yet another possible solution for the mapping algorithm is a greedy algorithm. Although this alternative has low computation complexity (and may thus be suitable for real-time mapping to support hitless updates), the greedy algorithm cannot guarantee an optimal mapping of the pipeline 105 of VFTs 106 onto the pipeline 107 of PFTs 108 (in terms of resource costs). The complexity of the greedy algorithm may be expressed as O(mn).

With the greedy mapping algorithm, the software tool 109 may map each VFT to a distinct PFT. If all VFTs 106 are mapped, then the software tool 109 may exit the algorithm with mapping success. If not, then the software tool 109 may begin merging the VFTs. If no merging can be performed, the software tool 109 may exit the algorithm with mapping failure. Otherwise, the software tool 109 may return to the previous mapping operation for the remaining VFTs and repeat this process until the mapping is complete or mapping failure causes exiting from the algorithm.

There may be at least two variants of greedy mapping. In a first-fit ("FF") variant, the software tool 109 may map a VFT to the first PFT in the pipeline 107 in which the VFT fits (i.e., the "first-fit PFT"). In a last-fit ("LF") variant, the software tool 109 may map a VFT to the last PFT in the pipeline 107 in which the VFT fits (i.e., the "last-fit PFT").

There may also be at least three variants of merging with the greedy algorithm. In a uniform ("uni") variant, the software tool 109 may merge every x VFTs (x=2, 3, . . . ). In a min-cost ("minC") variant, the software tool 109 may merge the two VFTs with the minimum cost. In the max-utilization ("maxU") variant, the software tool 109 may merge the two VFTs that fill up the first (or last) available PFT.

Examples of the present disclosure may take a pipeline of virtual flow tables with different properties and a pipeline of physical flow tables with different capabilities as inputs and may find the most resource-efficient mapping between the virtual flow tables and the physical flow tables. The mapping algorithm may be embedded in a software tool flow that maps a high-level description of packet processing specifications onto a hardware target. Three different physical flow table pipeline models are described above. The mapping algorithms described above may be extensible to any of various other suitable constraints (e.g., time, power, and the like). The dynamic programming-based method described above may deliver optimal mapping results, and has a run time several orders of magnitude better than an exhaustive search or a human-involved mapping. Because of this low run time, the mapping may be performed in real time and provide for hitless updates.

Example Mapping Determination Operations

Figure 5:
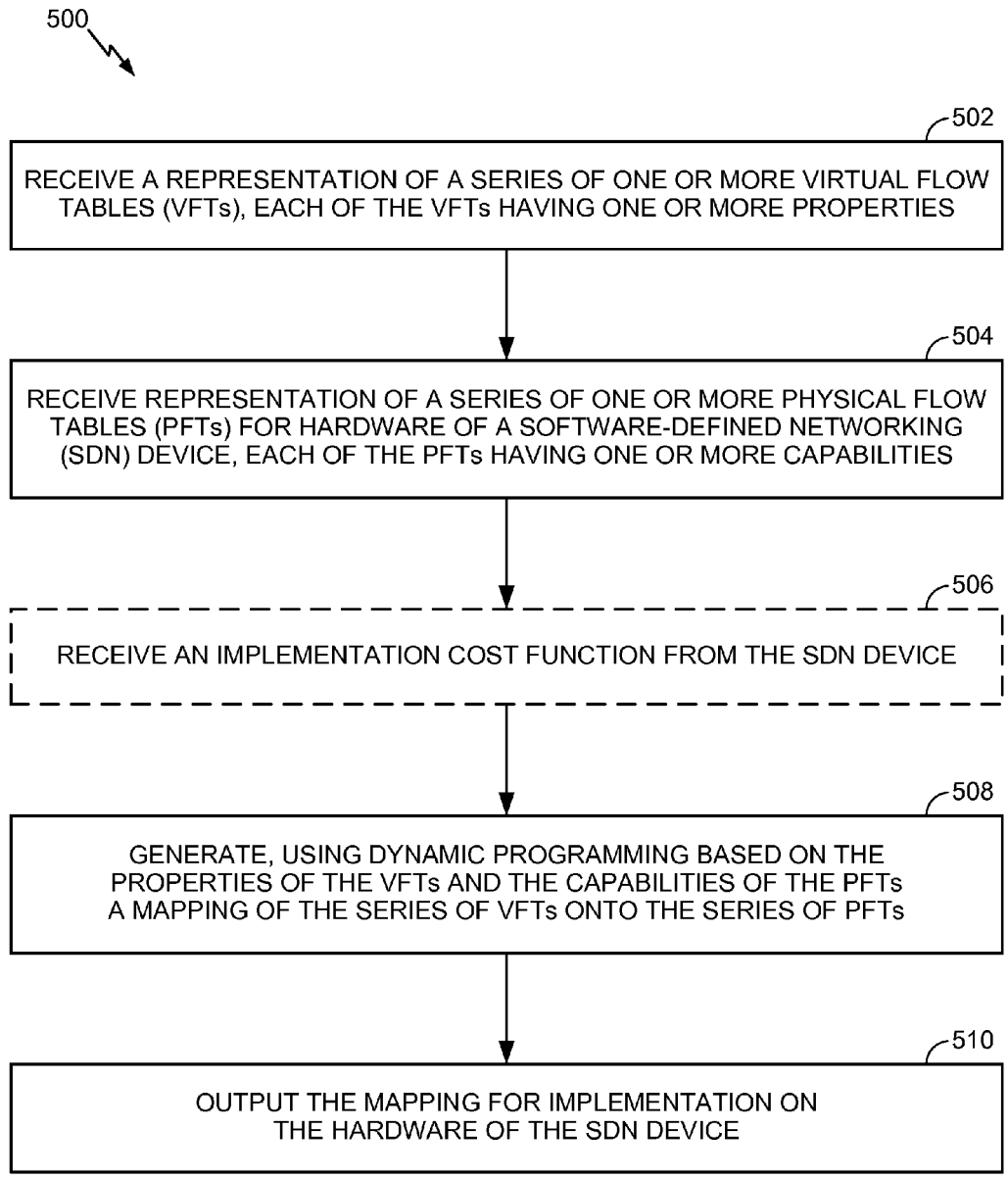
FIG. 5 is a flow diagram of example operations for determining a configuration for an SDN device, in accordance with an example of the present disclosure.
Figure 6:
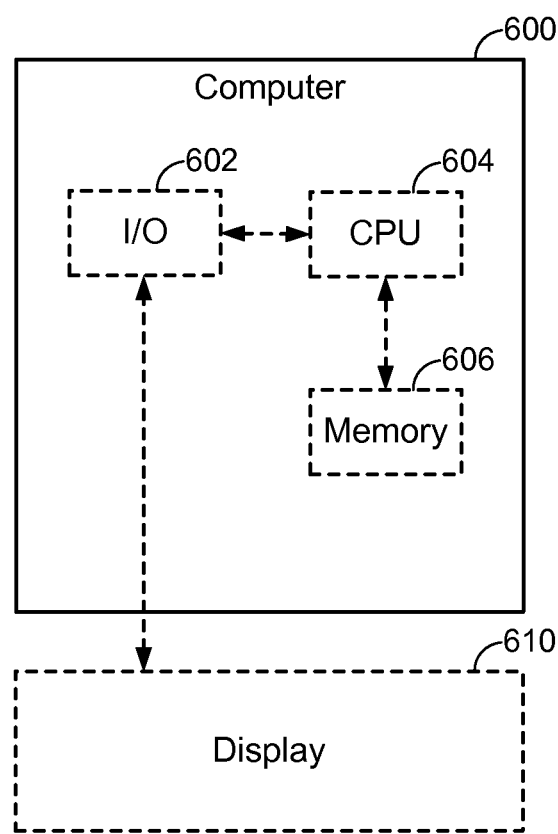
FIG. 6 is a block diagram of a general-purpose computer that may be used as a programming system for determining a configuration for an SDN device, in accordance with an example of the present disclosure.

FIG. 5 is a flow diagram of example operations 500 for determining a configuration for a software-defined networking (SDN) device (e.g., SDN device 102), in accordance with an example of the present disclosure. The operations 500 may be performed, for example, by an apparatus having a processing system, such as the server 104 shown in FIG. 1 or a general-purpose computer 600 as illustrated in FIG. 6 and described below.

The operations 500 may begin, at block 502, with the apparatus receiving a representation of a series of one or more virtual flow tables (VFTs) (e.g., VFTs 106). Each of the VFTs may have one or more properties. For example, the one or more properties may include at least one of a table width, a table depth, or a table type for each of the VFTs. For some examples, the representation of the series of VFTs may be received from the SDN device.

At block 504, the apparatus may receive a representation of a series of one or more physical flow tables (PFTs) (e.g., PFTs 108) for hardware of the SDN device. Each of the PFTs may have one or more capabilities. For example, the one or more capabilities may include at least one of a table width, a table depth, or a table type for each of the PFTs. For some examples, the representation of the series of PFTs may be received from the SDN device.

At block 508, the apparatus may generate, using dynamic programming based on the properties of the VFTs and the capabilities of the PFTs, a mapping of the series of VFTs onto the series of PFTs. The mapping may be for a data plane of the SDN device. Alternatively, the apparatus may determine that the series of VFTs cannot be mapped onto the series of PFTs. At block 510, the apparatus may output the generated mapping from block 508 to the SDN device (e.g., as an output message 112) for implementation on the hardware of the SDN device.

According to some examples, generating the mapping at block 508 may involve using dynamic programming based on the properties of the VFTs, the capabilities of the PFTs, and an implementation cost function having a plurality of implementation cost factors based on different table types. For some examples, the operations 500 may further entail the apparatus receiving the implementation cost function at block 506 before generating the mapping at block 508. The apparatus may receive the implementation cost function from the SDN device. For other examples, the apparatus may receive the implementation cost function from another device or from a memory (e.g., memory 606) internal to or externally connected with the apparatus.

According to some examples, the different table types may include an exact match (EM) type, a prefix match (PM) type, and a wildcard match (WM) type. For some examples, the SDN device may comprise a field programmable gate array (FPGA). In this case, the EM type may have an implementation cost factor of 1, the PM type may have an implementation cost factor of 2, and the WM type may have an implementation cost factor of 6 in the FPGA, for example.

According to some examples, generating the mapping at block 508 may involve selecting a PFT in the series of PFTs; determining a cost function based on a table type for the selected PFT in the series of PFTs; and calculating, according to the cost function, a resource cost of mapping a set of the VFTs onto the selected PFT. For some examples, the selected PFT may be a fixed PFT, and in this case, the cost function may be based on a width of the fixed PFT multiplied by a product of one or more depths of a set of the VFTs. For other examples, the selected PFT may be a flexible PFT, and in this case, the cost function may be based on a sum of one or more widths of a set of the VFTs multiplied by a product of one or more depths of the set of the VFTs. For still other examples, the selected PFT may be a hybrid PFT, and in this case, the cost function may be based on an implementation cost factor according to a table type of the hybrid PFT multiplied by a width of the hybrid PFT and multiplied by a product of one or more depths of a set of the VFTs. For some examples, the cost function indicates a significantly high resource cost (e.g., positive infinity) if at least one of the capabilities of the selected PFT is exceeded when the resource cost is calculated.

According to some examples, generating the mapping at block 508 further entails selecting a VFT in the series of VFTs according to an index; determining an indexed minimum cost of mapping another set of the VFTs, earlier in the series of VFTs before the set of VFTs, onto a set of PFTs earlier in the series before the selected PFT, wherein the other set of the VFTs ends with the selected VFT and wherein the set of the VFTs begins with a next VFT in the series of VFTs after the selected VFT; adding the resource cost to the indexed minimum cost to generate an indexed total cost; repeating selecting the VFT, calculating the resource cost, determining the indexed minimum cost, and the adding, with an updated value for the index representing each of the VFTs in the series to generate a plurality of indexed total costs associated with each different index value; and selecting one of a plurality of mappings associated with the minimum of the plurality of indexed total costs as the generated mapping.

According to some examples, generating the mapping at block 508 occurs in real time and sufficiently fast enough to support "hitless updates," such that the data plane of the SDN device can be altered between packets with no disruption in (line-rate) service.

According to some examples, the operations 500 may further involve the apparatus generating an implementation (e.g., a bitstream for a programmable IC) for the SDN device based on the mapping and sending the implementation to the SDN device.

According to some examples, the apparatus for determining the configuration for the SDN device may be implemented with a general-purpose computer 600, as illustrated in FIG. 6. The computer 600 includes a central processing unit (CPU) 604, one or more input/output (I/O) ports 602 connected with the CPU 604, and a memory 606 connected with the CPU 604. Although shown as being internal to the computer 600, the memory 606 may also be external to the computer 600 or both internal and external thereto. Mapping software (e.g., the software tool 109) configured to determine the resource-efficient mapping of the series of VFTs onto the series of PFTs may run on the CPU 604. For some examples, the computer 600 may also be connected with a display 610 (e.g., an LED display, plasma display, LCD display, cathode ray tube (CRT), and the like) via the I/O ports 602.

Examples of the present disclosure provide a real-time technique for mapping a pipeline of VFTs onto a pipeline of PFTs in hardware for an SDN data plane (or other equivalent packet-processing plane). One example technique involves a dynamic programming-based optimization algorithm, which has a shorter run-time (e.g., by multiple orders of magnitude) than conventional (non-real-time) algorithms, such as an exhaustive search method. The techniques described herein have a significant technical effect on implementation of an SDN device in an integrated circuit (IC), such as a field programmable gate array (FPGA). The techniques may be used to generate a mapping, which may then be implemented in the IC, such as being configured in an FPGA. As a result, the IC (e.g., FPGA) can more efficiently implement an SDN device. Furthermore, the techniques described herein improve the function of the apparatus (e.g., computer or other processing system) used to generate the mapping since, as described above, the dynamic programming-based optimization algorithm has a shorter run-time than conventional algorithms.

As used herein (including the claims that follow), a phrase referring to "at least one of a list of items refers to any combination of those items, including single members. As an example," at least one of: x, y, or z" is intended to cover: x, y, z, x-y, x-z, y-z, x-y-z, and any combination thereof (e.g., x-y-y and x-x-y-z).

While the foregoing is directed to examples of the present disclosure, other and further examples of the disclosure may be devised without departing from the basic scope thereof, and the scope thereof is determined by the claims that follow.

What is claimed is:

1. A method of determining a configuration for a software-defined networking (SDN) device, comprising:
   receiving a representation of a series of one or more virtual flow tables (VFTs), each of the VFTs having one or more properties;
   receiving a representation of a series of one or more physical flow tables (PFTs) for hardware of the SDN device, each of the PFTs having one or more capabilities;
   generating, using dynamic programming based on the properties of the VFTs and the capabilities of the PFTs, a mapping of the series of VFTs onto the series of PFTs, wherein generating the mapping comprises:

selecting a PFT in the series of PFTs;

determining a cost function based on a table type for the selected PFT in the series of PFTs; and calculating, according to the cost function, a resource cost of mapping a set of the VFTs onto the selected PFT, wherein the selected PFT comprises a hybrid PFT and wherein the cost function is based on an implementation cost factor based on a table type of the hybrid PFT multiplied by a width of the hybrid PFT and multiplied by a product of one or more depths of a set of the VFTs; and outputting the mapping for implementation on the hardware of the SDN device, wherein using dynamic programming is faster than an exhaustive search.

2. The method of claim 1, wherein the one or more properties comprise at least one of a table width, a table depth, or a table type for each of the VFTs.

3. The method of claim 1, wherein the one or more capabilities comprise at least one of a table width, a table depth, or a table type for each of the PFTs.

4. The method of claim 1, wherein generating the mapping comprises using dynamic programming based on the properties of the VFTs, the capabilities of the PFTs, and an implementation cost function having a plurality of implementation cost factors based on different table types.

5. The method of claim 4, further comprising receiving the implementation cost function from the SDN device before generating the mapping.

6. The method of claim 4, wherein the different table types comprise an exact match (EM) type, a prefix match (PM) type, and a wildcard match (WM) type, wherein the SDN device comprises a field programmable gate array (FPGA), and wherein an implementation cost factor for each of the EM type, the PM type, and the WM type is different for the FPGA.

7. A method of determining a configuration for a software-defined networking (SDN) device, comprising:

receiving a representation of a series of one or more virtual flow tables (VFTs), each of the VFTs having one or more properties;

receiving a representation of a series of one or more physical flow tables (PFTs) for hardware of the SDN device, each of the PFTs having one or more capabilities;

generating, using dynamic programming based on the properties of the VFTs and the capabilities of the PFTs, a mapping of the series of VFTs onto the series of PFTs, wherein generating the mapping comprises:

selecting a PFT in the series of PFTs;

determining a cost function based on a table type for the selected PFT in the series of PFTs; and calculating, according to the cost function, a resource cost of mapping a set of the VFTs onto the selected PFT, wherein the selected PFT comprises a fixed PFT and wherein the cost function is based on a width of the fixed PFT multiplied by a product of one or more depths of a set of the VFTs; and outputting the mapping for implementation on the hardware of the SDN device, wherein using dynamic programming is faster than an exhaustive search.

8. A method of determining a configuration for a software-defined networking (SDN) device, comprising:

receiving a representation of a series of one or more virtual flow tables (VFTs), each of the VFTs having one or more properties;

receiving a representation of a series of one or more physical flow tables (PFTs) for hardware of the SDN device, each of the PFTs having one or more capabilities;

generating, using dynamic programming based on the properties of the VFTs and the capabilities of the PFTs, a mapping of the series of VFTs onto the series of PFTs, wherein generating the mapping comprises:

selecting a PFT in the series of PFTs;

determining a cost function based on a table type for the selected PFT in the series of PFTs; and calculating, according to the cost function, a resource cost of mapping a set of the VFTs onto the selected PFT, wherein the selected PFT comprises a flexible PFT and wherein the cost function is based on a sum of one or more widths of a set of the VFTs multiplied by a product of one or more depths of the set of the VFTs; and outputting the mapping for implementation on the hardware of the SDN device, wherein using dynamic programming is faster than an exhaustive search.

9. The method of claim 1, wherein the cost function indicates a significantly high resource cost if at least one of the capabilities of the selected PFT is exceeded when the resource cost is calculated.

10. A non-transitory computer readable-medium for determining a configuration for a software-defined networking (SDN) device, the computer-readable medium comprising instructions executable by a processing system to:

receive a representation of a series of one or more virtual flow tables (VFTs), each of the VFTs having one or more properties;

receive a representation of a series of one or more physical flow tables (PFTs) for hardware of the SDN device, each of the PFTs having one or more capabilities;

generate, using dynamic programming based on the properties of the VFTs and the capabilities of the PFTs, a mapping of the series of VFTs onto the series of PFTs, wherein generating the mapping comprises:

selecting a PFT in the series of PFTs;

determining a cost function based on a table type for the selected PFT in the series of PFTs; and calculating, according to the cost function, a resource cost of mapping a set of the VFTs onto the selected PFT, wherein the selected PFT comprises a hybrid PFT and wherein the cost function is based on an implementation cost factor based on a table type of the hybrid PFT multiplied by a width of the hybrid PFT and multiplied by a product of one or more depths of a set of the VFTs; and output the mapping for implementation on the hardware of the SDN device.

11. The computer readable-medium of claim 10, wherein the one or more properties comprise at least one of a table width, a table depth, or a table type for each of the VFTs and wherein the one or more capabilities comprise at least one of a table width, a table depth, or a table type for each of the PFTs.

12. The computer readable-medium of claim 10, wherein generating the mapping comprises using dynamic programming based on the properties of the VFTs, the capabilities of the PFTs, and an implementation cost function having a plurality of implementation cost factors based on different table types.

13. The computer readable-medium of claim 10, wherein the cost function indicates a significantly high resource cost if at least one of the capabilities of the selected PFT is exceeded when the resource cost is calculated.

14. An apparatus for determining a configuration for a software-defined networking (SDN) device, comprising:
a processing system programmed to:
receive a representation of a series of one or more virtual flow tables (VFTs), each of the VFTs having one or more properties;
receive a representation of a series of one or more physical flow tables (PFTs) for hardware of the SDN device, each of the PFTs having one or more capabilities;
generate, using dynamic programming based on the properties of the VFTs and the capabilities of the PFTs, a mapping of the series of VFTs onto the series of PFTs, wherein generating the mapping comprises:
selecting a PFT in the series of PFTs, wherein the selected PFT comprises a hybrid PFT;
determining a cost function based on a table type for the selected PFT in the series of PFTs; and
calculating, according to the cost function, a resource cost of mapping a set of the VFTs onto the selected PFT, wherein the cost function is based on an implementation cost factor based on a table type of the hybrid PFT multiplied by a width of the hybrid PFT and multiplied by a product of one or more depths of a set of the VFTs; and
output the mapping for implementation on the hardware of the SDN device; and
a memory coupled to the processing system and configured to store at least one of instructions for the processing system, the representation of the series of VFTs, the representation of the series of PFTs, or the mapping.

15. The apparatus of claim 14, wherein the one or more properties comprise at least one of a table width, a table depth, or a table type for each of the VFTs and wherein the one or more capabilities comprise at least one of a table width, a table depth, or a table type for each of the PFTs.

16. The apparatus of claim 14, wherein generating the mapping comprises using dynamic programming based on the properties of the VFTs, the capabilities of the PFTs, and an implementation cost function having a plurality of implementation cost factors based on different table types.

17. The apparatus of claim 16, wherein the processing system is further programmed to receive the implementation cost function from the SDN device before generating the mapping.

18. The apparatus of claim 16, wherein the different table types comprise an exact match (EM) type, a prefix match (PM) type, and a wildcard match (WM) type, wherein the SDN device comprises a field programmable gate array (FPGA), and wherein an implementation cost factor for each of the EM type, the PM type, and the WM type is different for the FPGA.

* * * * *